（12）United States Patent
Johnson et al.

(10) Patent No.: US 9,194,633 B2
(45) Date of Patent: Nov. 24, 2015

(54) BOLT WITH INTEGRATED GASKET

(71) Applicant: BP Corporation North America Inc., Houston, TX (US)

(72) Inventors: Keith L. Johnson, Ferndale, WA (US); Tobin D. Hood, Bellingham, WA (US)

(73) Assignee: BP Corporation North America Inc., Houston, TX (US)

( * ) Notice: Subject to any disclaimer, the term of this patent is extended or adjusted under 35 U.S.C. 154(b) by 134 days.

(21) Appl. No.: 13/840,279

(22) Filed: Mar. 15, 2013

(65) Prior Publication Data
US 2014/0271033 A1   Sep. 18, 2014

(51) Int. Cl.
F16B 33/00 (2006.01)
F28F 9/10 (2006.01)
F16B 43/00 (2006.01)
F28F 9/02 (2006.01)

(52) U.S. Cl.
CPC ............... F28F 9/10 (2013.01); F16B 43/001 (2013.01); *F28F 9/0219* (2013.01); *F28F 2230/00* (2013.01); *F28F 2275/20* (2013.01)

(58) Field of Classification Search
CPC ...... F16B 33/004; F16B 35/00; F16B 35/065; F16B 43/001; F16B 33/00
USPC .......... 411/360, 368, 369, 370, 371.1, 371.2, 411/517, 533, 542; 470/3
See application file for complete search history.

(56) References Cited

U.S. PATENT DOCUMENTS

| | | | | |
|---|---|---|---|---|
| 1,953,305 A | * | 4/1934 | MacLean | 411/399 |
| 1,969,796 A | * | 8/1934 | Hoke | 411/366.1 |
| 2,096,040 A | * | 10/1937 | Hosking | 411/187 |
| 3,153,971 A | * | 10/1964 | Lovisek | 411/371.1 |
| 3,191,730 A | * | 6/1965 | Fischer | 411/542 |
| 4,744,187 A | * | 5/1988 | Tripp | 52/410 |
| 4,887,951 A | * | 12/1989 | Hashimoto | 411/371.1 |
| 5,141,375 A | | 8/1992 | Pollizzi | |
| 5,649,511 A | * | 7/1997 | Nguyen | 123/198 R |
| 5,846,040 A | * | 12/1998 | Ueno | 411/45 |
| 2004/0052610 A1 | * | 3/2004 | Kaupanger | 411/371.2 |
| 2007/0031207 A1 | | 2/2007 | Rosenbaum | |
| 2007/0292241 A1 | * | 12/2007 | Snow et al. | 411/542 |
| 2008/0232993 A1 | | 9/2008 | Tsuda | |
| 2008/0273940 A1 | | 11/2008 | Horowitz | |
| 2010/0065370 A1 | | 3/2010 | Frauendorf | |
| 2013/0266397 A1 | * | 10/2013 | Amano et al. | 411/371.2 |

FOREIGN PATENT DOCUMENTS

CN          201358987 Y      9/2009
(Continued)

OTHER PUBLICATIONS

John Crane--S-Cranefoil-A, Flexible Graphite Gasket, 1998 John Crane Mechanical Seals, 2 pgs.
(Continued)

*Primary Examiner* — Roberta Delisle
(74) *Attorney, Agent, or Firm* — Kelly L. Cummings; Ekkehard Schoettle

(57) ABSTRACT

A threaded bolt or plug includes a compressible gasket ring adhered to the underside of the bolt head or plug head. The underside of the bolt head includes at least two concentric grooves covered by the compressible gasket.

20 Claims, 3 Drawing Sheets

(56) References Cited

FOREIGN PATENT DOCUMENTS

| | | |
|---|---|---|
| CN | 201827208 U | 5/2011 |
| CN | 201858245 U | 6/2011 |
| CN | 202348907 U | 7/2012 |
| JP | 4145210 A | 5/1992 |
| JP | 03545436 B2 | 7/2004 |
| KR | 1049918 B1 | 7/2011 |

OTHER PUBLICATIONS

Nylok—Nyseal Product Sheet (2010), http://www.nylok.com/our-products/under-the-head-sealants/nyseal, 1 pg.
Garlock—Metal/Soft Material Gaskets product brochure, Garlock Sealing Technologies, http://www.garlock.com/en/, Feb. 2011, 12 pgs.
DIN 1514-6, Flanges and their joints, Mar. 2004.

* cited by examiner

US 9,194,633 B2

BOLT WITH INTEGRATED GASKET

BACKGROUND

1. Technical Field

This invention relates to fasteners, bolts and threaded plugs, and mechanisms for sealing the bolt holes or plug holes.

2. Background

Threaded bolts and threaded plugs used in piping and equipment in high pressure service typically require use of a loose gasket between the bolt head and the piping or equipment. The gasket helps seal the holes and prevent leakage of high pressure material from around the threads of the bolts or plugs. A common service for gaskets and threaded plugs is on the tube sheet header of fin fan exchangers in chemical plants. Existing plug gaskets include flat soft metal ring, or a flat metal ring sandwiched between two sheets of flexible graphite over each side. The flat metal ring may have concentric grooving on both sides surfaced with graphite or PTFE to form a covered serrated metal gasket, also known as a Kammprofile gasket. The DIN EN 1514-6 Standard describes details of such gaskets.

The costs associated with the use of conventional loose gaskets are not minimal. Significant time and labor costs may be incurred to ensure proper seating of the loose gasket on the bolt or plug before fastening. The gaskets may be over compressed resulting in damage to the gasket requiring its replacement, or in severe instances, damage to the equipment in contact with the gasket. The costs for purchasing the gaskets in large volumes add up. The costs for inventory and control of different size gaskets and matching them with the correct size bolt or plug also add up. Therefore, it may be desirable to have an improved design for a gasket that costs less and requires less labor to install.

BRIEF SUMMARY

A threaded bolt or plug includes a compressible gasket ring adhered to the underside of the bolt head or plug head. The underside of the bolt head includes at least two concentric grooves covered by the compressible gasket. In one embodiment, the compressible gasket is a flexible graphite material. In another embodiment, the concentric grooves have a flat surface between the grooves, and the groove depth is about two to four times the radial width of the flat surface. In yet another embodiment, the grooves have a depth from about 0.005 to 0.017 inches (0.127 to 0.43 mm). The compressible gasket may be mechanically pressed against the bolt head into the grooves and adhered by resultant friction. Alternatively, an adhesive may be used to couple the gasket to the bolt head.

Further features and advantages of the present invention are set forth in the following more detailed description.

DETAILED DESCRIPTION OF THE DRAWINGS AND THE PRESENTLY PREFERRED EMBODIMENTS

Figure 1:
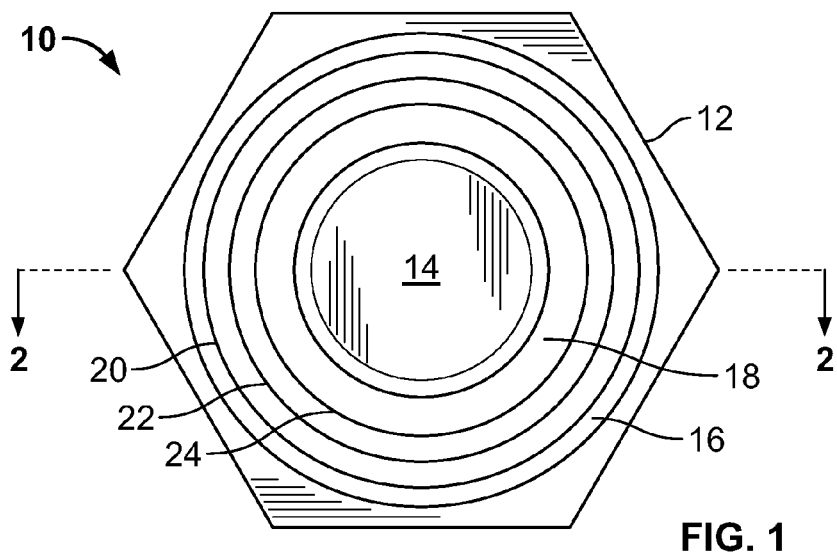
FIG. 1 is a bottom elevation view of a threaded bolt with exposed grooves in the bearing surface on the underside of the head in accordance with one embodiment.

Referring to FIG. 1, a bottom view of a bolt 10 or plug (referred hereinafter as bolt, although bolt and plug may be used interchangeably for purposes herein) is illustrated showing the exposed underside of the bolt (figure not to scale). The bolt includes a head 12 that may have a hexagonal shape, as illustrated. The bolt shaft 14 is centrally located within the head. The underside of the bolt head includes bearing surfaces 16 and 18. A plurality of concentric grooves 20, 22 and 24 are cut into the underside of the bolt head. Preferably, the grooves are positioned around the shaft 14 and coaxially aligned with the shaft. However, the concentric grooves may be slightly offset from coaxial alignment with the shaft. In an alternative embodiment, not shown, the grooves may not be concentric, but may include one or more spiral grooves extending from the inner bearing surface 18 to the outer bearing surface 16. With any groove configuration, it is desirable for the outer bearing surface 16 extend fully around the grooves to provide sufficient contact with a gasket placed over the grooves and bearing surfaces.

Figure 2:
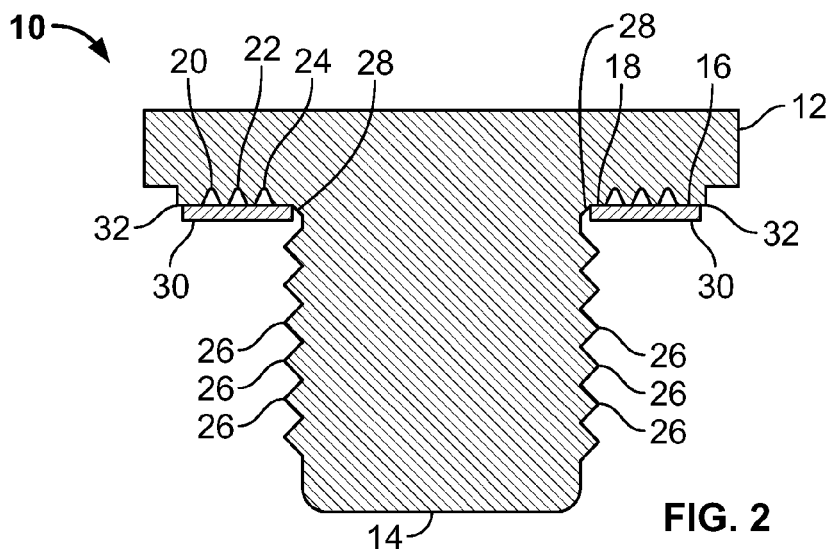
FIG. 2 is a cross sectional view 2-2 of the threaded bolt of FIG. 1 with a gasket ring coupled to the head.

Referring to FIG. 2, a cross-sectional view of FIG. 1 across line 2-2 is shown, along with an added gasket, in accordance with one embodiment of the invention (figure not to scale). The bolt 10 includes a bolt head 12 and a shaft 14 with threads 26, which may be integrally formed with the bolt head as a unitary piece. The bolt is illustrated with three concentric grooves 20, 22 and 24 disposed in the underside of the bolt head 12 between the radially outward bearing surface 16 and the radial inward bearing surface 18. The bolt includes at least two concentric grooves, preferably at least three concentric grooves, and may include four or more concentric grooves. The number of grooves depends on the width of the underside of the bolt head, the depth and angle of the grooves, and the desired width of the bearing surface inward and outward of the grooves. A flat ring shaped gasket 30 is adheringly disposed on the bearing surfaces 16 and 18 and covering the grooves 20, 22 and 24. The gasket preferably covers all of the grooves to ensure a tight seal may be formed against the piping or equipment against which it is installed. The gasket may extend past the grooves to cover at least a portion of either or both the bearing surfaces 16 and 18 on either the inner or outer sides of the grooved surface. Preferably, the gasket extends to the outer edge of the bearing surface. The inside diameter of the gasket may be sized to cooperate to readily center or coaxially align the gasket 30 over the bearing surfaces and grooves. The bolt is illustrated with an optional chamfered edge 28 at the shaft 14 and bearing surface 18 junction. The chamfered edge 28 may be of a minimal radius dimension resulting from machining practices associated with manufacture of the bolt, and is shown in exaggerated size in FIG. 2. Preferably, there is no chamfered edge to avoid interference with full insertion of the bolt into the threaded bolt hole. Depending on the gasket material, the gasket 30 may be mechanically pressed into the grooves and through resultant friction adhere to the bolt head. Alternatively, an adhesive 32 is applied between the gasket 30 and the underside of the bolt head to adhere the gasket to the bolt head.

Figure 3:
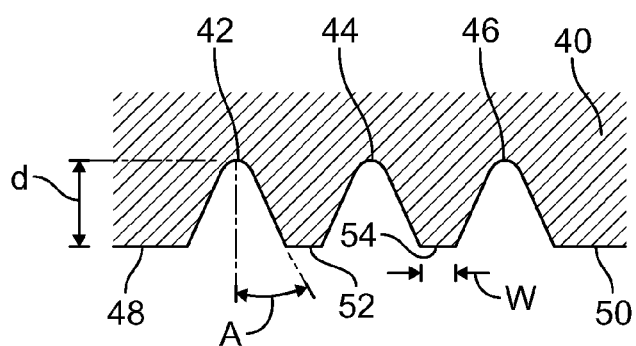
FIG. 3 is a cross sectional expanded view of the grooves in the bearing surface in the underside of the head, in accordance with another embodiment.

Referring to FIG. 3, another embodiment of the grooves is shown in an expanded cross-sectional view (figure not to scale). A bolt head 40 includes three concentric grooves 42, 44 and 46. The grooves are disposed between an inward bearing surface 48 and an outward bearing surface 50. Between each two grooves, a flat groove surface 52 and 54 is provided. Preferably, each groove and each flat groove surface have similar dimensions. Each groove may have an angle "A," that is the angle formed between a side wall of a groove and a line perpendicular to the bearing surface, from about 25 to 50 degrees. Preferably, the groove angle "A" is about 30 degrees or about 45 degrees. Each groove may have a depth "d" measured from the bearing surface to the narrow bottom point of the groove of from about 0.005 to 0.030 inches (0.127 to 0.76 mm). Preferably, the groove depth "d" is from about 0.007 to 0.017 inches (0.178 to 0.43 mm). More preferably, the groove depth is less than about 0.015 inches (0.38 mm). The groove depth may be reduced to about 0.012 inches (0.305 mm), for example when the groove angle is about 45 degrees, or to about 0.008 inches (0.203 mm), for example when the groove angle is about 30 degrees, to accommodate more grooves within a given bearing face of a bolt head. The shallower the grooves and the smaller the groove angle, then the greater the number of concentric grooves may be accommodated within the bearing surface. Between each two grooves, the flat groove surface may have a width "w" in the radial direction that is from about 0.002 to 0.006 inches (0.05 to 0.15 mm). Preferably, the width "w" is about 0.004 inches (0.10 mm). The width should be small enough to sufficiently "bite" into a gasket when the bolt is tightened, yet large enough to create sufficient surface are for maintaining a sufficient gasket thickness to prevent marring of the mating sealing surfaces. The flat groove surface is preferably co-planar with the bearing surface, but may be slightly above or below the plan of the bearing surface, provided it is substantially parallel thereto to provide similar compressive forces against the gasket.

As noted above, these dimensions may be adjusted depending on the size of the bolt, the size of the face on the underside of the bolt head, and the size of the gasket that may be accommodated, such that 2, 3, 4 or more grooves may be used. A compressible gasket with a thickness of from about 0.010 to 0.090 inches (0.254 to 2.29 mm) may be useful. For flexible graphite gaskets, thicknesses from about 0.015 to 0.035 inches (0.38 to 0.89 mm) may be desirable. A compressible gasket that has a thickness from 1.2 to 3 times the groove depth may be preferred, and a gasket thickness about twice the groove depth is more preferred. Accordingly, a gasket with a thickness about 0.020 inches (0.508 mm) may be useful with a groove depth from about 0.008 to 0.017 inches (0.20 to 0.43 mm).

Figure 4A:
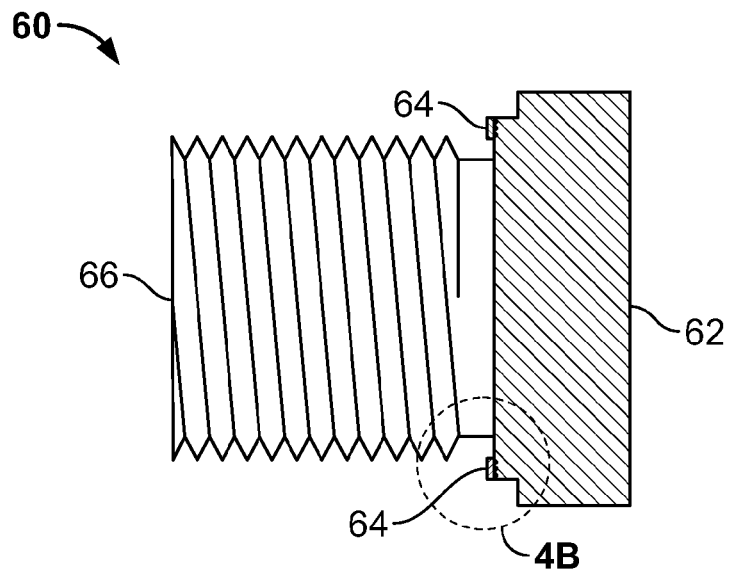
FIGS. 4A-C are multiple expanded views of another embodiment of a bolt with an integrated gasket.
Figure 4B:
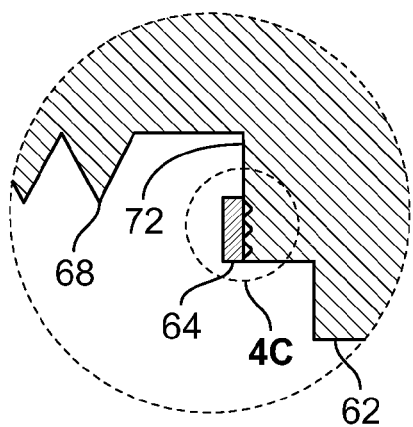
Figure 4C:
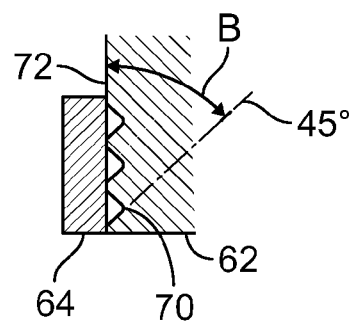

Referring to FIG. 4A, an alternative embodiment of a bolt with an integrated gasket is shown in a mixed side view (figure not to scale). In this embodiment, a representative plug 60 for a fin fan exchanger tube sheet header is illustrated. The plug head 62 is shown in cross-section, and the threaded shaft 66 is shown in side elevation view. A compressible gasket 64 is compressed against the outer perimeter of the underside of the plug head. As shown in expanded view in FIGS. 4B and 4C, the gasket ring 64 has an inside diameter about the same size as the outside diameter of the threads 68 on the plug shaft, such that the gasket ring 64 may slide over the shaft and be positioned against the grooves 70 in the plug head 62. The outside diameter of the gasket ring is preferably at least the same size as or slightly larger than the outside diameter of the bearing surface 72 of the plug head. The grooves 70 are illustrated having a groove angle "B" of 45 degrees.

Figure 5:
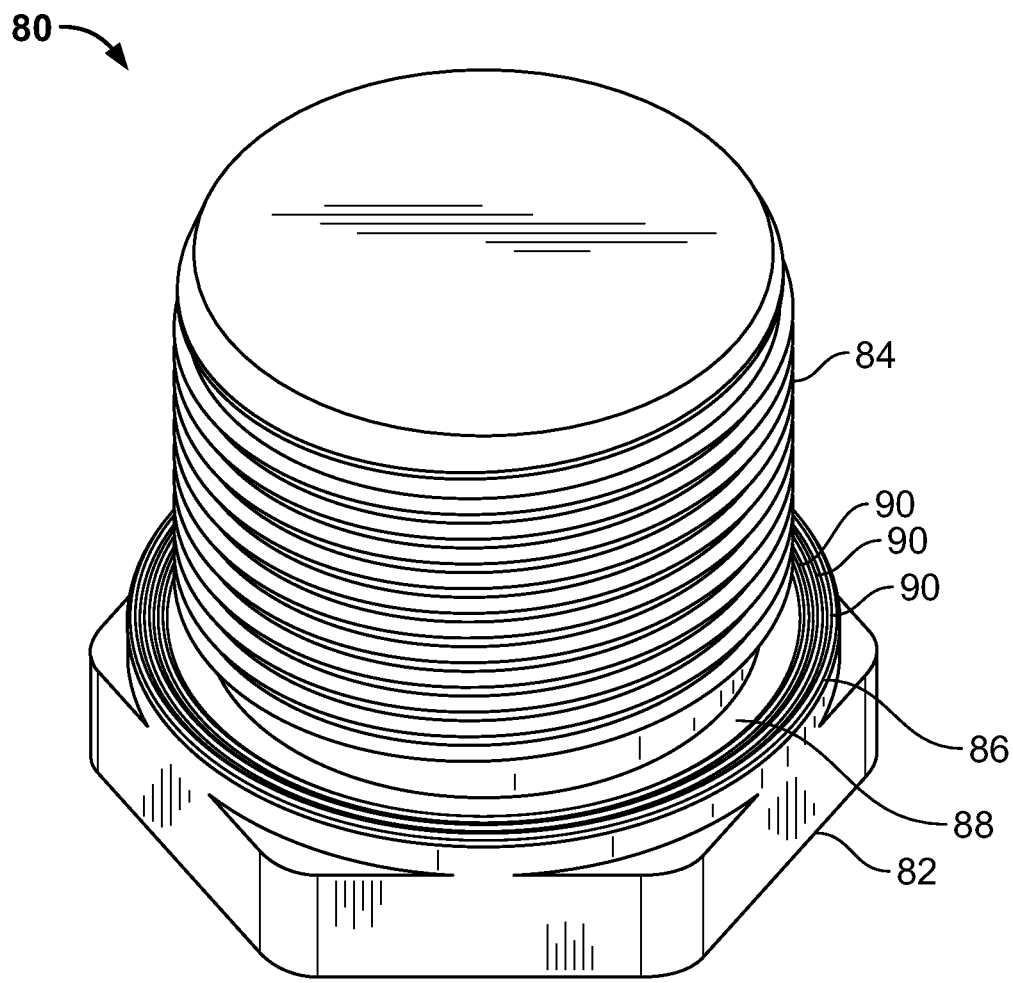
FIG. 5 is a bottom perspective view of another embodiment of a bolt with grooves in the bearing surface in the underside of the head.

Referring to FIG. 5, another embodiment of a bolt 80 without a gasket is shown in a bottom perspective view. This figure may be more representative of the relative scale of the elements of a bolt made in accordance with an embodiment of the invention. The bolt 80 includes a head 82 and a threaded shaft 84. Three concentric grooves 90 are located in the underside of the head. The outer bearing surface 86 and inner bearing surface 88 are located on either side of the set of concentric grooves.

The grooves may be machined in the bearing surface on the underside of the bolt head using a lathe or other capable machine tool. Alternatively, the grooves may be molded or stamped into the bolt, depending on the methods used for manufacturing the bolt. It is preferred that the bottom of the grooves have as large a radius as possible.

The gasket is made of a compressible material. Preferably, the gasket is a non-asbestos material, such as may be known or found to be useful as sheet gasket material. Preferably, the material is a compressible PTFE or carbon fiber sheet gasket. More preferably, the material is a flexible graphite material, one form of which is commercially available under the brand Graphfoil®. Although soft compressible gaskets may include laminates with steel or metal layers, such laminate gaskets are usually more expensive than single material sheet gaskets, which are preferred. Such gasket material used in the embodiments described above may be useful in service with equipment handling temperatures ranging from −200 to 1200° F. and pressures from vacuum to 3000 psig.

As described above, the gasket may be adhered to the underside of the bolt head using an adhesive or a glue material. Adhesives, such as 3M Super 77 or other glue, may be useful. Preferably, the adhesive will have a long shelf life, be durable and retain adhesive properties for the expected extended inventory or shelf life of the bolt and gasket. The glue should preferably be applied between the gasket and the bearing surface, rather than filling the grooves.

In another embodiment of the invention, a method is provided for making a bolt with an integrated gasket. The method includes cutting at least two concentric grooves in the bearing surface in the underside of the bolt head, providing a ring shaped gasket of a compressible material, optionally applying an adhesive to one side of the gasket, placing the gasket on the underside of the bolt head to cover the grooves, and optionally pressing the gasket into the grooves.

In another embodiment of the invention, a bolt with grooves in the underside of the bolt head may be provided in accordance with the invention by one party, the gasket provided by a second party, and the gasket and bolt assembled by a third party.

Embodiments of the invention may find economic usefulness in services where the bolts are not reused when removed, and instead new bolts are used. Where the costs of new bolts are substantial, depending on labor costs, it may be more economical to clean the grooved surface of the bolt and press on or glue a new gasket on the old bolt. For example, threaded plugs on fin fan exchanger tube sheet header boxes are usually replaced with new plugs on a periodic basis each time the tube sheets are serviced.

While the invention has been described with reference to certain embodiments, other features may be included without departing from the spirit and scope of the invention.

The invention claimed is:

1. An apparatus comprising:
   a bolt head having a bearing surface with at least two concentric grooves disposed therein;
   a threaded shaft integrally formed with said bolt head and extending centrally from the bearing surface; and
   a compressible gasket ring disposed around the shaft and adheringly disposed on the bearing surface of the bolt head covering the at least two concentric grooves, wherein the compressible gasket ring comprises flexible graphite, flexible carbon fiber, or PTFE for use in high-temperature applications.

2. The apparatus of claim 1 comprising, three concentric grooves disposed in the bearing surface, and the compressible gasket covering the three concentric grooves.

3. The apparatus of claim 1 comprising four concentric grooves disposed in the bearing surface, and the compressible gasket covering the four concentric grooves.

4. The apparatus of claim 1 comprising a flat groove surface between each two of the at least two concentric grooves, the flat groove surface being substantially co-planar with said bearing surface.

5. The apparatus of claim 1 comprising a flat groove surface between each two of the at least two concentric grooves, the flat groove surface being in a plane substantially parallel to a plane of said bearing surface.

6. The apparatus of claim 5 comprising a groove depth in a direction perpendicular to said bearing surface, the flat groove surface having a width in a radial direction, wherein the groove depth is at least about twice the dimension of the flat groove surface width.

7. The apparatus of claim 6 wherein the groove depth is from about 0.005 to 0.017 inches (0.127 to 0.43 mm).

8. The apparatus of claim 6 wherein the compressible gasket ring, has a thickness in a direction perpendicular to the bearing surface that is from 1.2 to 3 times the groove depth.

9. The apparatus of claim 1 further comprising an adhesive disposed between the gasket and the bolt head.

10. The apparatus of claim 1 further comprising an adhesive disposed between and in contact with the gasket and the bolt head.

11. The apparatus of claim 1, wherein an innermost groove of the at least two concentric grooves has an inside diameter greater than an outside diameter of the threaded shaft.

12. The apparatus of claim 1, wherein a groove angle formed between an interior side wall of the concentric grooves and a line perpendicular to the bearing surface is from about 25 to 50 degrees.

13. The apparatus of claim 12, wherein the groove angle is about 30 degrees.

14. The apparatus of claim 12, wherein the groove angle is about 45 degrees.

15. The apparatus of claim 1, wherein the compressible gasket comprises flexible graphite.

16. The apparatus of claim 1, wherein the compressible gasket comprises flexible carbon fiber.

17. A method for making the apparatus of claim 1, the method comprising:
providing a bolt having a bolt head with a bearing surface on an underside of the bolt head;
cutting two or more concentric grooves into the bearing surface; and
adhering a compressible gasket ring over the concentric grooves.

18. The method of claim 17, wherein the adhering comprises mechanically pressing the gasket ring into the concentric grooves with sufficient force such that the gasket adheres to the grooved bearing surface.

19. The method of claim 17, wherein the cutting comprises creating three concentric grooves having a depth of from about 0.005 to about 0.017 inches with a flat surface between each groove having a width in the radial direction of from about 0.003 to about 0.005 inches.

20. The method of claim 17, wherein the compressible gasket ring comprises flexible graphite or PTFE, and has a thickness from 0.015 to 0.035 inches, and the grooves have a depth that is from one-third to two-thirds of the thickness of the gasket ring.

* * * * *